May 20, 1924.

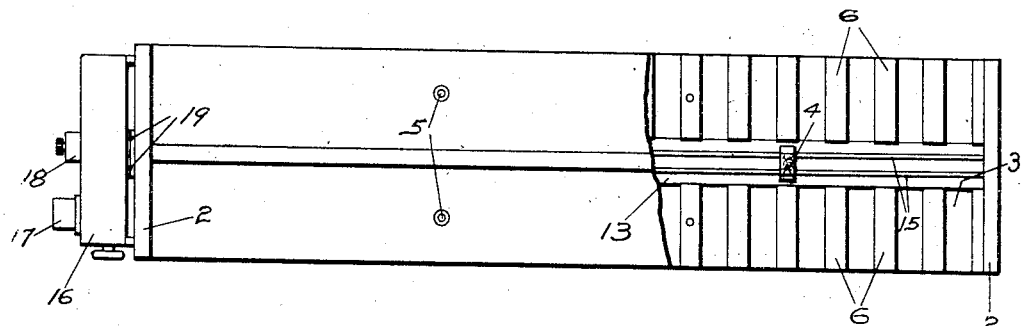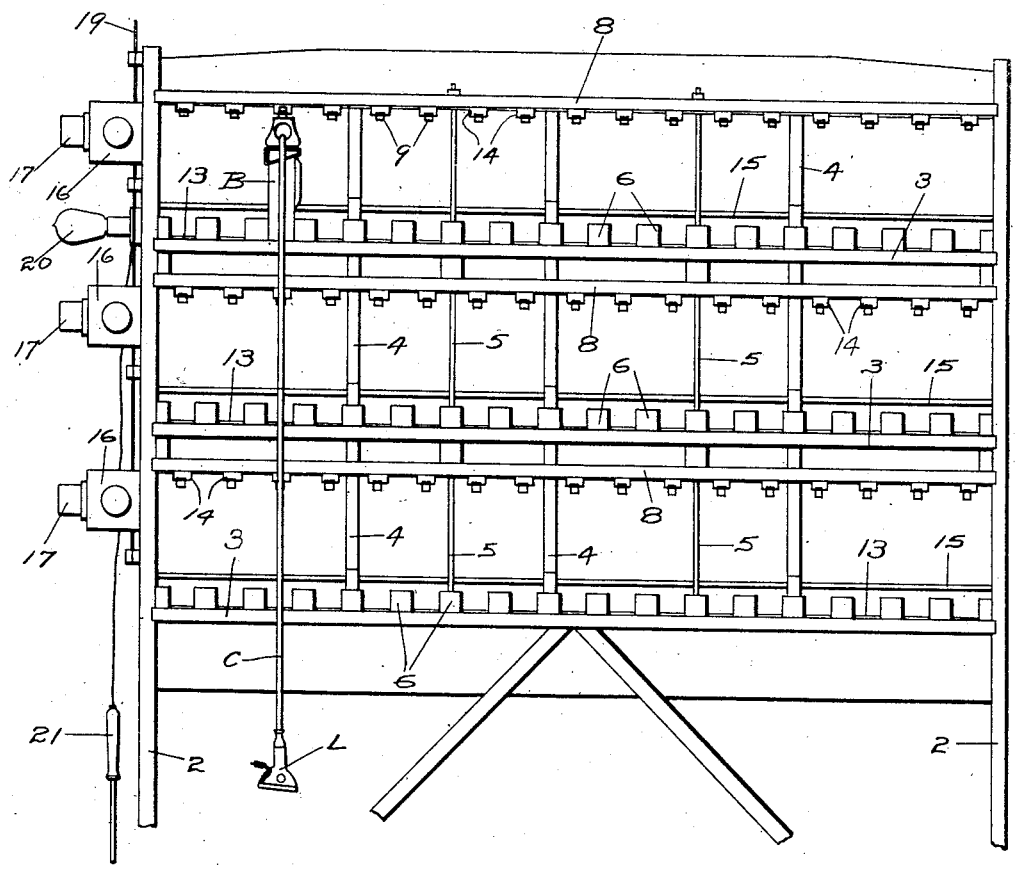

G. WHEAT

BATTERY CHARGING APPARATUS

Filed Aug. 6, 1919

INVENTOR
Grant Wheat
by Charles W. McDermott
his attorney

Patented May 20, 1924.

1,494,397

UNITED STATES PATENT OFFICE.

GRANT WHEAT, OF MARLBORO, MASSACHUSETTS, ASSIGNOR TO KOEHLER MANUFACTURING COMPANY, OF MARLBORO, MASSACHUSETTS, A CORPORATION OF MASSACHUSETTS.

BATTERY-CHARGING APPARATUS.

Application filed August 6, 1919. Serial No. 315,683.

*To all whom it may concern:*

Be it known that I, GRANT WHEAT, a citizen of the United States, residing at Marlboro, in the county of Middlesex and State of Massachusetts, have invented certain Improvements in Battery-Charging Apparatus, of which the following description, in connection with the accompanying drawings, is a specification, like reference characters on the drawings indicating like parts in the several figures.

This invention relates to apparatus for charging storage batteries, particularly the light portable batteries carried by miners for the purpose of lighting a lamp mounted on the miner's cap, although the invention also is applicable to the charging of batteries of other types. It is the chief object of the invention to devise an apparatus with which batteries of this type can be conveniently charged, which can be economically manufactured, will facilitate the handling of the batteries in the lamp or battery house, and which can also be used to temporarily store the batteries after the charging operation has been completed.

The invention will be herein disclosed as embodied in an apparatus designed particularly for use in charging batteries of the type disclosed in my co-pending application Serial No. 101,437, filed June 3, 1916. Batteries of this type are each provided with a pair of charging contacts or terminals located on the top of the battery casing in an exposed position. A cap lamp is permanently attached to the battery (as disclosed in my pending application Serial No. 141,133, filed January 8, 1917) and the battery casing is provided with a key-operated switch by means of which the connection between the battery terminals and the lamp and the charging terminals is controlled. That is, the switch can be turned either to connect the battery with the charging terminals or with the lamp.

The various features of the invention will be readily understood from the following description and will be particularly pointed out in the appended claims.

Referring now to the accompanying drawings:

Figure 1 is a side elevation of an apparatus embodying the present invention;

Fig. 2 is a plan view of the apparatus shown in Fig. 1, certain parts, however, being broken away;

Figure 5:
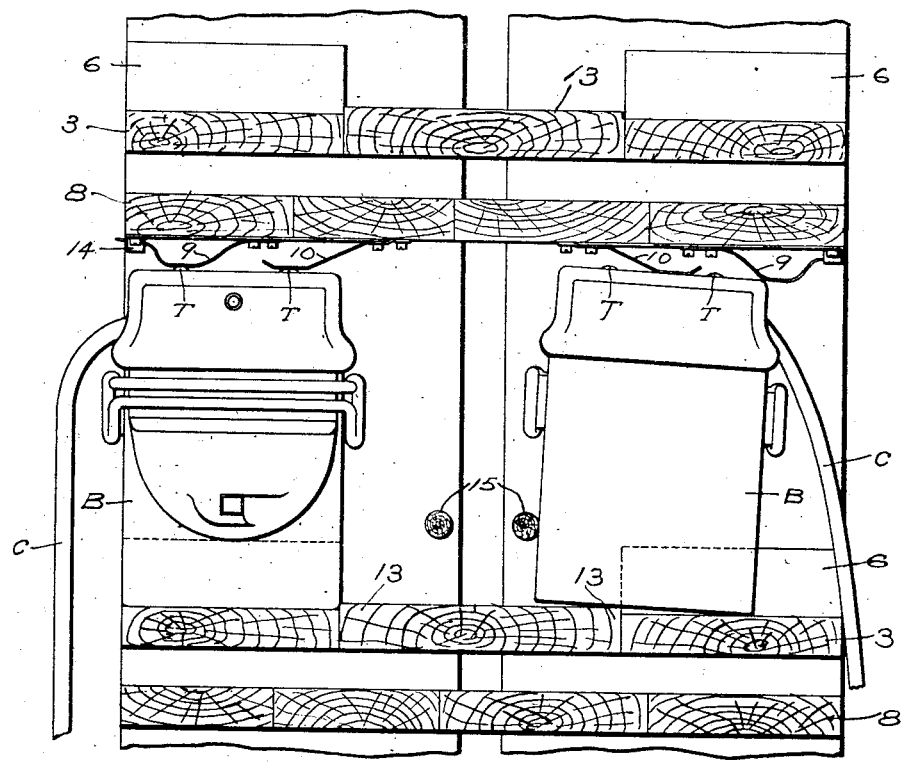
Fig. 5 is a vertical, transverse, cross sectional view through a part of the apparatus.

The apparatus shown comprises a rack having end pieces or uprights 2—2 and a series of shelves 3 supported by said uprights. Suitable spacing members 4 and stay rolls 5 assist in supporting the shelves in their proper relationship and give rigidity to the rack. Each shelf is provided with a series of blocks or partitions 6 which divide the shelves into a series of stalls or compartments, each of suitable width to receive a battery casing, indicated at B in Fig. 1. Preferably the rack is made double; that is, it is provided with compartments on opposite sides thereof, as indicated in Figs. 2 and 5, so that two rows of battery compartments are provided on each shelf.

It will be seen from an inspection of Figs. 1 and 2 that the battery B when placed in the rack in charging position has the lamp L attached thereto by the cable C which carries the conductors that connect the lamp with the storage battery.

Located immediately above each shelf 3 and separated therefrom by a distance slightly greater than the height of the battery casing is another shelf 8 that carries the conductors which supply the charging current to the batteries. As above stated, this type of battery carries a pair of external charging contacts, indicated at T—T, Fig. 5. A pair of charging terminals is so arranged in each compartment that they are engaged by the charging contacts T on a battery when a battery is placed in charging position in one of the compartments. This arrangement is illustrated in Fig. 5, in which one of the charging terminals for the compartment in which the battery B is located is designated at 9 while the other is designated at 10, both of these terminals being in engagement with the contacts T—T. Consequently, when the battery is in this position and the key-operated switch which it carries is properly turned, the battery will be charged. In order to facilitate the proper positioning of a battery in a compartment for the charging operation, each compartment is provided with a stop 13, Figs. 1, 2 and 5, against which the bottom of the battery strikes as it is pushed into one of the compartments. This stop may consist simply of a board extending the length of the shelf and lying between the inner ends of the two series of partitions 6, as clearly shown in Fig. 2.

It is desirable to charge these batteries in series in order to insure the charging of all the batteries in the circuit at a uniform rate. Consequently, the charging terminals 9 and 10 are connected in such a manner that they form a normally closed circuit, and they are so arranged that the act of placing a battery in one of the compartments opens this circuit and connects the battery therein and the removal of the battery automatically restores the circuit again to its original condition.

Figure 3:
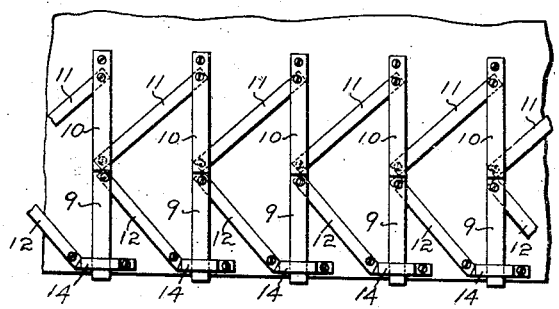
Fig. 3 is a bottom view showing the connections for conducting the charging current to the batteries.
Figure 4:
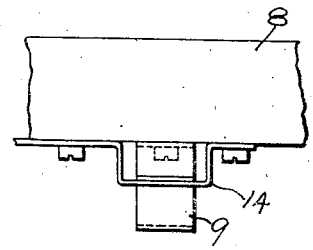
Fig. 4 is a front elevation showing a switch that is opened automatically when a battery is placed in charging position in the apparatus.

Referring to Fig. 3, which illustrates the bottom of one of the shelves 8 as it would appear from a point below the shelf, it will be noted that a diagonal conductor 11 connects the base of each terminal 9 with the base of the terminal 10 in the next adjacent compartment, while another conductor 12 connects the base of each terminal 9 with a U-shaped clip or stirrup 14 in which the free end of the terminal 9 in the next adjacent compartment normally rests. Each pair of terminals 9 and 10 is made of brass, or other spring material so tensioned that they normally occupy the positions in which they are shown at the right of Fig. 5 but can be moved upwardly out of said position by the engagement therewith of the terminals T—T of the battery B. It should be particularly noted that the stirrup 14 is located at the front of each compartment. This member with the terminal 9 forms, in effect, a switch which is normally closed but is opened when a battery is in charging position. This location of the switch at the front of the compartment where its condition can be readily observed at all times by the attendant is an important feature, since obviously if one of the terminals 9 becomes accidentally bent so that it does not open when the battery is inserted or it is not closed when the battery is withdrawn or is pushed back into storage position, such a condition will interrupt the normal operation of the apparatus and the fact that these parts are in plain view greatly facilitates detection of the trouble and its subsequent correction.

When there is no battery in a given compartment, the current enters that compartment along the diagonal conductor 12 and passes through the stirrup 14 into the terminal 9, which rests against the stirrup, and then leaves the compartment through the next diagonal conductor 12. If there are no batteries on one of the shelves, the current will travel from one compartment to another traversing the entire length of the shelf in the manner just described. The return circuit is completed through the conductors on the opposite side of the shelf.

In the circuit for each shelf and located at the end of the rack is a rheostat 16, an ammeter 17 and a switch 18, the three circuits in the rack thus being independently controlled and all connected in multiple to a pair of supply wires 19 that lead from the source of current supply. It is obvious that with this arrangement the attendant can regulate the current very accurately in accordance with the number of batteries in each circuit by turning the handle of the rheostat and watching the ammeter until he has secured an adjustment which gives the required amperage in the circuit.

Referring now to Fig. 5 it will be seen that when a battery B is pushed into charging position in one of the compartments, as shown at the left in Fig. 5, the engagement of the contacts T—T on the battery with the charging terminals 9 and 10 in that particular compartment will move the free end of the terminal 9 out of engagement with the stirrup 14, thus opening the normal circuit through this compartment. The current will then enter this compartment through the diagonal conductor 11, Fig. 3, will pass through the conductor 10 to the contact T, through the battery to the terminal 9 and will leave the compartment along either the diagonal conductor 12 or 11, depending upon whether or not a battery is in the next adjacent compartment. That is, if no battery is in the next compartment, the current will enter that compartment along the conductor 12, but if a battery is located in charging position in said compartment, then the current will enter this compartment along the conductor 11. After the battery has been charged it can be removed if desired, or it can be tipped up slightly to clear the stop 13, as shown at the right in Fig. 5, and then be pushed back in the compartment until it strikes the rod 15 which runs the entire length of the shelf between the two rows of compartments and acts as a stop. This stop determines the storage position of the battery in the compartment. When in this position, however, the contacts T are out of engagement with the charging terminals 9 and 10 and the free end of the contact 9 is in engagement with the stirrup 14. In other words, the battery at this time is out of charging position and is simply stored in the compartment. It has, however, been moved out of engagement with the terminal 9 so that this terminal is returned to its normal position where it co-operates with the adjacent conductors to carry current through the compartment in the same manner that it would if the battery were not located in the compartment.

For convenience in testing and locating trouble I prefer to include a lamp 20 in one side of the main supply circuit 19 and run a conductor from the other terminal of the lamp to a hand contact 21 which can be placed at will on any of the contacts 9, 10, 11 or 12 to test out portions of the circuit.

It will now be evident that this arrangement provides a very convenient apparatus for charging batteries and for taking care of them during the entire time that they are in the battery house, since it not only provides suitable compartments to receive them during the charging period, but also provides for their storage during the entire time that they are in the battery house. It also facilitates the orderly and systematic handling of the batteries. The apparatus is also conveniently arranged to facilitate the adjustment of the resistance in each charging circuit from time to time as that becomes necessary by the introduction into the circuit or the removal therefrom of additional batteries. The uprights 2 preferably are made long enough to support the shelves at such a height that the lamp casings L will not drag on the floor.

While I have herein shown and described the best embodiment of the invention of which I am at present aware, it is obvious that this embodiment may be modified in many particulars without departing from the spirit or scope of the invention.

What is claimed as new, is:

1. A battery charging apparatus having a compartment constructed to receive a storage battery, and charging terminals with which the terminals of the battery may be either engaged to charge the battery or disengaged to interrupt the charging of the battery by changing the position of the battery while it is supported in the compartment.

2. A battery charging apparatus having a series of compartments each constructed to receive a storage battery, and charging terminals with which the terminals of the battery may be either engaged to charge the battery or disengaged to interrupt the charging of the battery by changing the position of said battery while it remains in one of said compartments.

3. A battery charging apparatus having a compartment constructed to receive a storage battery, and charging terminals arranged and positioned to be engaged by the terminals of said battery when it is in said compartment, said terminals and battery being relatively movable to charge the battery or to interrupt the charging operation while the battery is supported in said compartment.

4. A battery charging apparatus having a compartment constructed to receive a storage battery having charging contacts thereon, charging terminals arranged to be engaged by said contacts when the battery is in said compartment, or to be disengaged therefrom by changing the position of said battery while it remains in said compartment, whereby said battery may be stored in said compartment after it has been charged, and stops determining the charging and storing positions of said battery in said compartment.

5. A battery charging apparatus having a series of compartments each constructed to receive a storage battery, a pair of charging terminals for each of said compartments, conductors co-operating with said terminals to form therewith a normally closed circuit arranged to be opened automatically upon the placing of the battery in one of said compartments to connect said battery in said circuit, and a stop for each compartment determining the charging position of said battery therein, said terminals and conductors being arranged to restore automatically said circuit to its original condition upon the movement of said storage battery out of said charging position.

6. A battery charging apparatus having a series of compartments each constructed to receive a storage battery, charging terminals arranged and positioned to be engaged by the terminals of said battery when it is in one of said compartments, a stop near the back of said compartment arranged to engage the base of the battery to determine the position of the battery for the engagement of said charging terminals with the terminals of said battery but over which said battery may be moved to disconnect its terminals from said charging terminals, and another stop limiting the latter movement of said battery.

7. A battery charging apparatus having a compartment to receive and support a storage battery, charging terminals mounted in said apparatus and arranged to be engaged by the terminals of said battery when the battery is placed in said compartment, conductors co-operating with said terminals to form a charging circuit arranged to be broken automatically at a point near the front of said compartment by the placing of said battery in said compartment and to be restored automatically again when said battery is moved into a non-charging position in said compartment.

8. A battery charging apparatus having a series of compartments each constructed to receive a storage battery, a pair of charging terminals arranged in each compartment to be engaged by the terminals of said battery when it is placed in said compartment, and connections conducting current to said terminals including a conducting member located at the front of said compartment with which one of said terminals normally is in contact but which is automatically disconnected from said member by the engagement of said battery with said terminal.

9. A rack for charging storage batteries provided with external charging contacts, said rack comprising a shelf, partitions dividing said shelf into a series of adjacent compartments each adapted to receive a storage battery, a pair of charging terminals for each of said compartments, each of said terminals consisting of a spring conductor arranged to yield by the engagement therewith of the charging terminals on said battery, and conductors co-operating with said charging terminals of the different compartments to form a circuit that is normally closed but is constructed to be opened automatically to connect a battery therein by the placing of a battery in said compartment with its terminals in engagement with said charging terminals, said conductors including a stirrup at the front of the compartment with which one of said terminals normally is in contact and said terminal being arranged to be moved out of contact with said stirrup when it is engaged by a charging terminal of said battery.

10. A battery charging apparatus comprising a rack having a series of compartments therein each constructed to receive a storage battery, said compartments being open at one side whereby a battery may be inserted in any one of said compartments or removed therefrom by a lateral movement, and a pair of charging terminals in each compartment with which the terminals of the battery may either be engaged to charge the battery or disengaged to interrupt the charging of the battery by changing the position of the battery in the compartment.

11. A battery charging apparatus comprising a rack having a series of compartments therein each constructed to receive a storage battery, said compartments being open at one side whereby a battery may be inserted in any one of said compartments or removed therefrom by a lateral movement, a pair of charging terminals in each of said compartments with which the terminals of a storage battery may be engaged to charge the battery, and conductors co-operating with said terminals to form a normally closed charging circuit arranged to be broken automatically by the placing of a battery in a compartment and to be restored automatically again when said battery is moved into a non-charging position in said compartment or is removed from the compartment.

In testimony whereof I have signed my name to this specification.

GRANT WHEAT.